United States Patent
Kim et al.

(10) Patent No.: US 10,685,540 B2
(45) Date of Patent: *Jun. 16, 2020

(54) PAGING SYSTEM AND METHOD USING WIRELESS COMMUNICATION

(71) Applicant: HELLOFACTORY CO., LTD., Seoul (KR)

(72) Inventors: Kyungmin Kim, Seoul (KR); Hyun Jip Kim, Seoul (KR)

(73) Assignee: HELLOFACTORY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/422,945

(22) Filed: May 24, 2019

(65) Prior Publication Data

US 2019/0279474 A1 Sep. 12, 2019

Related U.S. Application Data

(63) Continuation of application No. 16/104,851, filed on Aug. 17, 2018, now Pat. No. 10,354,500, which is a (Continued)

(30) Foreign Application Priority Data

Feb. 2, 2017 (KR) .......................... 10-2017-0015186

(51) Int. Cl.
*H04W 4/02* (2018.01)
*G08B 7/06* (2006.01)
(Continued)

(52) U.S. Cl.
CPC ............... *G08B 7/06* (2013.01); *G08B 25/10* (2013.01); *H04B 5/02* (2013.01); *H04B 5/04* (2013.01); *H04W 4/023* (2013.01); *H04W 4/70* (2018.02); *H04W 4/80* (2018.02); *H04L 67/02* (2013.01); *Y02D 70/00* (2018.01); *Y02D 70/10* (2018.01); *Y02D 70/14* (2018.01); *Y02D 70/20* (2018.01); *Y02D 70/42* (2018.01)

(58) Field of Classification Search
CPC .................................... G08B 7/06; H04W 4/70
See application file for complete search history.

(56) References Cited

FOREIGN PATENT DOCUMENTS

| KR | 10-2009-0051566 | * | 11/2007 | ............... H04B 5/04 |
| KR | 10-2015-0088494 | * | 1/2014 | ............ H04W 92/18 |

* cited by examiner

*Primary Examiner* — Tuan H Nguyen
(74) *Attorney, Agent, or Firm* — Ladas & Parry, LLP

(57) ABSTRACT

A paging system comprise paging buttons configured to transmit a first signal including a paging request; a server configured to: receive the first signal, identify which of the paging buttons transmit the first signal received by the server, and transmit to at least one portable device a second signal including information on an identifier corresponding to the identified paging button that transmits the first signal, and the paging request; and at least one portable device configured to: display the identifier corresponding to the identified paging button and/or the paging request based on the second signal, and transmit to the server a third signal in response to an acceptance input responded to the paging request. The server transmits to at least one portable device a fourth signal confirming that the portable device transmitting the third signal is matched to the identified paging button in response to the third signal.

20 Claims, 8 Drawing Sheets

Related U.S. Application Data continuation-in-part of application No. PCT/KR2017/001257, filed on Feb. 6, 2017.

(51) Int. Cl.
*H04W 4/80* (2018.01)
*H04W 4/70* (2018.01)
*H04B 5/02* (2006.01)
*H04B 5/04* (2006.01)
*G08B 25/10* (2006.01)
*H04L 29/08* (2006.01)

PAGING SYSTEM AND METHOD USING WIRELESS COMMUNICATION

CROSS-REFERENCE TO RELATED APPLICATIONS

This application is a continuation of U.S. patent application Ser. No. 16/104,851 filed on Aug. 17, 2018, which is a continuation-in-part of International Patent Application No. PCT/KR2017/001257 filed on Feb. 6, 2017, which claims the priority to Korean Patent Application No. 10-2017-0015186 filed with the Korean Intellectual Property Office on Feb. 2, 2017, in which the entire contents are incorporated herein by reference.

TECHNICAL FIELD

Various embodiments of the present disclosure generally relate to a paging system and method using a wireless communication. More particularly, some embodiments of the present disclosure may relate to a beacon paging system capable of transferring to a service provider a signal corresponding to a request by using Bluetooth low energy (BLE) beacon devices enabling users to request service. In turn, the service provider is able to receive and store the request as a record, along with accurately and rapidly identifying each respective requests.

BACKGROUND

Through the industrial revolution and the information revolution, society is undergoing a hyper-connectivity revolution based on the Internet of Things (IoT), where everything can be connected to the Internet. Currently, things connected to the internet are less than 1% of all objects, but various innovations and business opportunities can be created in the future by using IoT technology.

As an example of ubiquitous IoT services, an internet-connected vehicle may support a service of automatically transmitting an emergency message and an autonomous driving service. In addition, healthcare products that may measure heart rate, the amount of exercise, etc. may support healthcare services. Smart homes services may include remote control services of home appliances or closed-circuit television (CCTV) monitoring.

IoT technologies may include sensing technologies, wired and wireless communication and network infrastructure technologies, and IoT service interfacing technologies. Such sensing technologies may include remote sensing by use of traditional sensors, such as a temperature sensor, a humidity sensor, a thermal sensor, a gas sensor, an illumination sensor, and an ultrasonic sensor; physical sensors that may acquire information from a physical object or surroundings such as a synthetic aperture radar (SAR), radar, a position sensor, a motion sensor, and an image sensor. Physical sensors are advancing to smart sensors that have standard interfaces and information processing capabilities to enhance application properties. Also, physical sensors may have a virtual sensing function of extracting certain information from sensed data and the virtual sensing function that may be implemented within IoT service interfaces. IoT sensing technologies employ a multiple sensor technology that is more advanced than conventional independent sensors and allow extraction of more intelligent and high-dimensional information.

Wired or wireless communication and IoT network infrastructure technologies may include all communication services, apparatuses, and network infrastructures that are used for networking humans, devices, and services regardless of communication protocols and physical layers such as wireless personal area networks (WPAN), Wi-Fi, 3G/4G/LTE, Bluetooth, Ethernet, broadband convergence network (BcN), satellite communication, microware, serial communication, and power line communication.

The IoT service interface enables interfacing of IoT entities such as humans, devices, and services with application services each of which provide a specific function. The IoT service interface is not a simple network interface, but a comprehensive term that provides or facilitates a variety of interfacing operations, for providing services, including: sensing, manipulation, extraction, processing, and storing of information; determination; situation awareness; recognition; security and privacy protection; authentication and authorization; discovery; object formalization; ontology-based semantics, open sensor-API, virtualization, positioning, processor management, open platforms, middleware; data mining; Web Services; and social network services.

Recently, device to device (D2D) communication may be performed by using a Bluetooth technology that is mainly used as a near field network technology, by using the same, uni-directional as well as bi-directional data whereby transmission and reception is available.

Bluetooth technology may replace multiple cable connections which are required between devices with a single wireless connection within a local area. For example, when Bluetooth wireless technology is implemented in a mobile phone and a laptop computer, the mobile phone and the laptop computer may be used without being connected to a cable. All types of digital devices including printers, personal digital assistants (PDAs), desktop computers, fax machines, keyboards, and joysticks may be a part of a Bluetooth system. The Bluetooth wireless technology allows devices to be free from cables and acts as a universal bridge in forming an interface between an existing data network and peripheral devices. This particular group between devices are spaced apart from a fixed network lower structure. Bluetooth has been designed to be operated even in a radio frequency environment with much noise. Therefore, Bluetooth ensures connection using rapid recognition and a frequency hopping method. A Bluetooth module performs new frequency hopping after receiving or sending a packet, thereby avoiding interference with other signals. Compared to other systems which are operated in the same frequency, Bluetooth uses particularly fast and short packets. Meanwhile, with the announcement of Bluetooth 4.0 with features including classic Bluetooth, Bluetooth high speed and Bluetooth low energy, interest in Bluetooth low energy technology is increasing.

In ultra near field communication technology, near field communication (NFC) is well known. When such NFC and RFID technology are used, beacons or iBeacon technology uses a Bluetooth bandwidth of 2.4 GHz.

Such a beacon may provide information customized according to movement of a user since the beacon can accurately identify the position of the user at a short distance. Accordingly, there are many applications in the marketing field.

The beacon technologies use a low powered device using Bluetooth low energy (BLE) that is Bluetooth version 4.0. This technology is also attracting attention.

In a conventional Bluetooth version, there are limitations on power efficiency and a number of devices that can be connected at the same time. In Bluetooth version 4.0, power consumption has been remarkably improved so that use for one year or more is available with a single coin-shaped battery and there is no limit on the number of devices that are connected at the same time. Accordingly, beacon services can become more widely available.

One of the beacon's feature is the ability to recognize ranges from 10 cm to 100 m and is available according to output power, along with the position of an individual that can be accurately identified even indoors with limited space no matter how many people there are. This information is consistent with an individual that may transmit different messages since each device provides different types of information.

SUMMARY

Various embodiments of the present disclosure may relate to a paging system and method. In some exemplary embodiments of the present disclosure, the paging system may comprise a paging button configured to output a signal of a predefined specific RF (AM, FM) frequency, and a display device configured to receive and output the signal on a screen. In some embodiments, the paging system may be capable of connecting various devices by using IoT technology to further evolve and eliminate limitations on approaching distances. Further, according to certain embodiments of the present disclosure, the paging system may transfer a paging number as well as requirements, checking a response time and store the paging object and the response time as data.

In addition, in order to expand the functions of a conventional paging system and provide efficient transmission in a paging button, a beacon may selectively transfer a signal including information of various requests of a user who presses the paging button. In addition, a receiver may provide a fast response by expressing the intention immediately rather than simply recognizing whether or not a request signal is input. For example, a smart watch, a smartphone, or a special purpose terminal carried or worn by the receiver may receive the request signal so that an efficient service may be available during busy work processing.

In addition, for according to certain exemplary embodiments of the present disclosure, the manager who manages the entire service and service processing for a user who has inputted a paging request may check whether or not a response service has actually been provided to the customer. In some embodiments of the present disclosure, the receiver may directly move to a position where the user who has inputted the paging request and interacts with the user, while checking whether or not an actual response service is provided and the elapsed time may be stored and managed as data. Accordingly, the entire service quality may be improved.

In some embodiments of the present disclosure, the method and paging system may be capable of efficiently providing a response service when a paging button transmitting a beacon signal receives a paging signal.

Accordingly, an object of certain embodiments of the present disclosure may be to provide an environment where communication between a person who inputs a paging request and a person who receives the paging request and may perform the paging request rapidly and/or accurately by using an wireless signal, for example, but limited to, a BLE beacon signal.

According to various embodiments of the present disclosure, a paging system may comprise a plurality of paging buttons configured to transmit a first signal including at least one paging request; a server configured to: receive the first signal including the paging request, identify which of the paging buttons transmits the first signal received by the server, and transmit to at least one portable device a second signal including information on an identifier corresponding to the identified paging button that transmits the first signal and the paging request; at least one portable device configured to: display the identifier corresponding to the identified paging button and/or the paging request based on the second signal transmitted from the server, and transmit to the server a third signal in response to an acceptance input responded to the paging request, wherein the server is configured to transmit to the at least one portable device a fourth signal confirming that the at least one portable device transmitting the third signal is matched to the identified paging button in response to the third signal received from the at least one portable device.

In certain embodiments, the system may further comprise at least one access point (AP) configured to receive the first signal from one of the paging buttons and transmit the first signal to the server.

In some embodiments, the first signal may be a Bluetooth low energy (BLE) signal.

In various embodiments, the identified paging button and/or the at least one portable device may be configured to transmit to the server a fifth signal including tagging information between the identified paging button and the at least one portable device.

In certain embodiments, the paging buttons may be configured to: transmit a first BLE signal to the AP in response to the paging request input to the paging buttons, and transmit a second BLE signal to the AP periodically regardless of the paging request input to the paging buttons.

In some embodiments, the first BLE signal and the second BLE signal may be different from each other, the first BLE signal transmitted in response to the paging request may include the at least one paging request, and the second BLE signal transmitted to the AP periodically may not include the at least one paging request.

In various embodiments, when the server receives a plurality of the third signals from a plurality of the at least one portable device, the server may be configured to select one of the plurality of the at least one portable device according to at least one predetermined factor and match the identified paging button with the selected portable device.

In certain embodiments, the server may be configured to select a portable device, from which the server receives the third signal first, among the plurality of the at least one portable device for a predetermined time.

In various embodiments, the tagging information may be generated when the at least one portable device is in contact with the paging button.

In some embodiments, the tagging information may be generated when the at least one portable device approaches the paging button within a preset distance range.

In certain embodiments, the system may further comprise a spatial management WEB server configured to manage the tagging information between the at least one portable device and the paging button.

In various embodiments, the system may comprise at least one customer device associated with one of the paging bells and configured to receive web order information from the server.

In some embodiments, the server may be configured to perform matching between the one of the paging buttons having transmitted the first signal and the customer device receiving the web order information.

In certain embodiments, the server may be configured to perform the matching based on the first signal transmitted from the one of the paging buttons and to determine that the matching has been performed between the one of the paging buttons and the at least one customer device when the at least one customer device transmits the web order information to the server.

According to various embodiments of the present application, a paging method may comprise: transmitting, by one of a plurality of paging buttons, a first signal including at least one paging request; receiving, by a server, the first signal including the paging request, identifying, by the server, which of the paging buttons transmits the first signal received by the server, and transmitting, by the server, to at least one portable device a second signal including information on identifier corresponding to the identified paging button that transmits the first signal, and the paging request; displaying, by the at least one portable device, the identifier corresponding to the identified paging button and/or the paging request based on the second signal transmitted from the server; transmitting, by the at least one portable device, to the server a third signal in response to an acceptance input responded to the paging request; and transmitting, by the server, to the at least one portable device a fourth signal confirming that the at least one portable device transmitting the third signal is matched with the identified paging button in response to the third signal received from the at least one portable device.

In some embodiments, the method may further comprise receiving, by at least one access point (AP), the first signal from one of the paging buttons and transmitting, by the at least one AP, the first signal to the server.

In certain embodiments, the first signal is a Bluetooth low energy (BLE) signal.

In various embodiments, the method may further comprise transmitting, by the identified paging button and/or the at least one portable device, to the server a fifth signal including tagging information between the identified paging button and the at least one portable device.

In some embodiments, the method may further comprise transmitting, by the paging buttons, BLE signals to the at least one AP periodically.

In certain embodiments, the method may further comprise, when the server receives a plurality of the third signals from a plurality of the at least one portable device, selecting, by the server, one of the plurality of the at least one portable device according to at least one predetermined factor and match the identified paging button with the selected portable device.

According to an embodiment of the present disclosure, a paging system may include: at least one paging button positioned at a specific space by being matched thereon; an access point (AP) receiving a Bluetooth low energy (BLE) signal transmitted from the at least one paging button; an operational server receiving a paging signal from the AP, and identifying a paging button that has transmitted a paging request based on the paging signal transmitted from the least one paging button; and at least one smart watch displaying paging information based on the paging signal transmitted from the operational server, wherein when the smart watch receives an acceptance input signal for the paging signal transmitted from the operational server, the smart watch transmits a matching signal to the operational server, the operational server is set to transmit a matching confirmation signal to the at least one smart watch in response to the received matching signal, and the operational server receives tagging information between the smart watch having transmitted the matching signal and the paging button having transmitted the paging request, thus completes the paging request.

Preferably, the at least one paging button may transmit a BLE signal to the AP when paging request information is input to the paging button, and transmit a BLE signal to the AP based on a preset transmission period regardless of the paging request information that is input to the paging button.

Preferably, the BLE signal transmitted when the paging button receives the paging request signal and the BLE signal transmitted regardless of the reception of the paging request information may be different, and the BLE signal transmitted when the paging request information is received may further include information indicating a paging request.

In addition, when the operational server receives a plurality of matching signals from the at least one smart watch, the operational server may match the paging button with one smart watch.

Preferably, the operational server may match the paging button with a smart watch corresponding to a matching signal received first among matching signals received for a predetermined time after the at least one smart watch has transmitted the paging signal.

Preferably, the tagging information may be information generated after the smart watch is physically in contact with the paging button.

Preferably, the tagging information may be information generated when the smart watch approaches the paging button within a preset distance range.

According to another embodiment of the present disclosure, a paging system may include: at least one paging button positioned at a specific space by being matched thereon; an access point (AP) receiving a Bluetooth low energy (BLE) signal transmitted from the at least one paging button; an operational server receiving a paging signal from the AP, and identifying a paging button that has transmitted a paging request based on the paging signal transmitted from the at least one paging button; at least one smart watch displaying paging information based on the paging signal transmitted from the operational server; and at least one smartphone receiving web order information from the operational server when the paging button transmits a BLE signal including information indicating a paging request, wherein when the smart watch receives an acceptance input signal for the paging signal transmitted from the operational server, the smart watch transmits a matching signal to the operational server, the operational server is set to transmit a matching confirmation signal to the at least one smart watch in response to the received matching signal, and the operational server receives tagging information between the smart watch having transmitted the matching signal and the paging button having transmitted the paging request, thus completes the paging request.

Preferably, the operational server may be set to perform matching between the paging button having transmitted a paging request signal and the smartphone receiving the web order information.

Preferably, the operational server may determine that matching between the paging button and the smartphone has been performed when the smartphone receives a BLE signal transmitted from the paging button, and the smartphone transmits order information to the operational server.

The smartphone may be a smartphone of a user who inputs a paging request signal to the paging button.

In addition, the smartphone may be a smartphone belonging to a provider of the paging system.

According to some embodiments of a paging system of the present disclosure, information on whether or not an actual response is provided to a customer can be checked after transmitting a paging signal.

In addition, according to certain embodiments of the present disclosure, after transmitting a paging signal, a paging request and/or a customer request may be transferred to a plurality of service providers at the same time so that a fast response can be provided to the customer. In addition, information on whether or not an actual response is provided and data used for determining an elapsed time for the actual response can be provided by a receiver who has accepted the paging signal as the receiver directly moves to the position where the person who has input the paging request is present. Accordingly, the entire service quality can be improved.

DETAILED DESCRIPTION OF EMBODIMENTS

Figure 1:
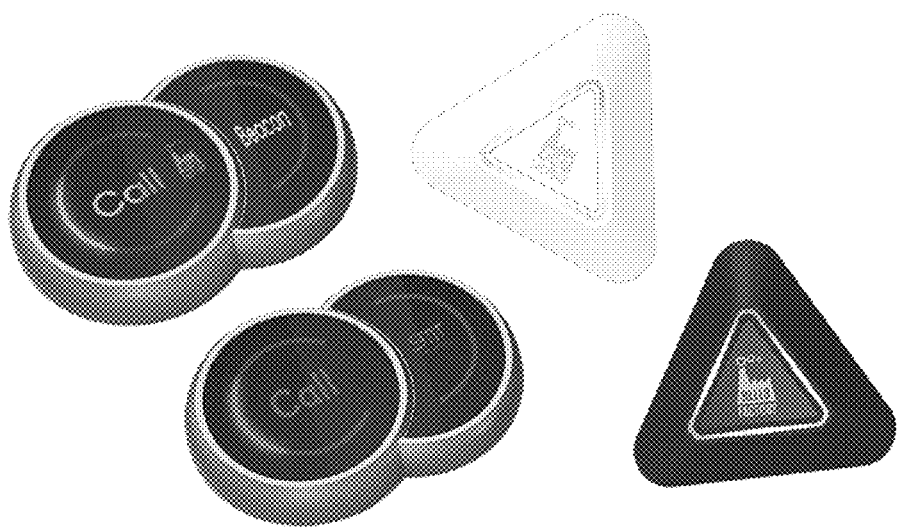
FIG. 1 illustrates beacon paging buttons according to exemplary embodiments of the present disclosure.

Since the present invention may be modified in various forms and may have various embodiments, the following exemplary embodiments are illustrated in the accompanying drawings and are described in detail with reference to the drawings.

However, this is not intended to limit the present invention to specific embodiments and the present invention should be construed to encompass various changes, equivalents, and substitutions within the technical scope and spirit of the invention. Like numbers refer to like elements throughout in the description of each drawing.

It will be understood that when an element is referred to as being, "connected" or "coupled," to another element, it can be directly or indirectly connected or coupled to the other element or intervening elements that may be present. In contrast, when an element is referred to as being, "directly connected" or "directly coupled," to another element, there are no intervening elements present.

The terminology used herein is for the purpose of describing particular embodiments only and is not intended to be limiting of the invention. As used herein, the singular forms are intended to include the plural forms as well, unless the context clearly indicates otherwise. It will be further understood that the terms, "comprise" "comprising", "include", "including", "have"/"has" and/or "having," when used herein, specify the presence of stated features, integers, steps, operations, elements, and/or components, but do not preclude the presence or addition of one or more other features, integers, steps, operations, elements, components, and/or groups thereof.

In some embodiments of the present disclosure, a "device" may be any device (or object) that can be applied to the IoT by being connected to a gateway. For example, devices may include a wireless pager, a smartphone, a tablet, a computer, a sensor (e.g. a temperature sensor, a humidity sensor, an acoustic sensor, a motion sensor, a proximity sensor, a gas detection sensor, and a heat detection sensor), a refrigerator, CCTV, a display device, TV, a washing machine, a dehumidifier, a lighting device, a fire alarm, and any electronic devices, although such is not required.

In certain embodiments of the present disclosure, a device may be interchangeably used with "terminal," "server," or "apparatus." In addition, the terms, "device," "apparatus," "server," and "terminal," may be described in the same or similar expression.

In various embodiments of the present disclosure, device information of a device may comprise information representing characteristics of the device. For example, the information may include an identification value(s) or character(s) of the device, a device type, types and characteristics of data sensed by the device, and a sensing period of the device.

In some embodiments of the present disclosure, services may include various services that may be provided by the device. Services may include services based on the communication with a server, wired or wireless apparatus or system, terminal or any device, and/or services operable within a device.

Preferably, services applied in certain embodiments of the present disclosure may be broadly understood to include various services that can be performed in a device in addition to services described by way of example in the present disclosure.

Hereinafter, exemplary embodiments of the present disclosure will be described in detail with reference to the accompanying drawings. Throughout the drawings, the same reference numerals will refer to the same or like parts and description of the same configuration element will be omitted.

FIG. 1 illustrates beacon paging buttons according to exemplary embodiments of the present disclosure.

In an exemplary embodiment, when an input signal is input to a button unit of a beacon paging button, a predetermined beacon signal may be transmitted. In some embodiments, the beacon signal may be implemented as, for example, but not limited to, a Bluetooth power (BLE) beacon signal. The BLE beacon signal transmitted by the beacon paging button may be received by a beacon access point (AP), and the beacon AP may receive the BLE beacon signal from one or more beacon paging buttons.

The beacon paging button may include one or more of a display unit, a button unit, a communication unit, and a control unit.

The display unit of the beacon paging button may display information that a button (or touch) input is available for a user who wants to page someone. The display unit may output information by using a light emitting device, such as liquid crystal, LCD, LED, TFT, etc., and if necessary, may display or output a printed image.

The button unit having a physical form, such as a pushbutton, may receive a physical input from a user and generate an electronic signal in response to the input from the user. Alternatively, the button unit may include a touch screen and receive a user input by receiving a touch input from the touch screen.

The communication unit may transmit a signal of the beacon paging button and receive signals from another device. For example, the communication unit may transmit BLE beacon signals and transmit and/or receive signals by using wired or wireless communication, such as cellular communication, Wi-Fi, NFC, Zigbee, etc.

The communication unit may use uni-casting, multi-casting, and broadcasting methods as a method of transmitting beacon signals. The uni-casting transmission method may be a one-to-one method, and the beacon paging button may respectively perform uni-casting of a beacon signal for another device. The multi-casting transmission method may be a method of transmitting the same beacon signal to a plurality of receivers at one time. The broadcasting transmission method may be a method of indiscriminately transmitting a signal to a plurality of other devices. The beacon paging button may transmit a beacon signal by using the broadcasting transmission method for advertisement so that the other devices may find the beacon paging button.

The control unit may control signals input from or output to, the display unit, button unit, and communication unit of the beacon paging button, while processing data so that the beacon paging button can operate as one device, although such is not required.

The beacon paging button may further include a fixing unit so that the beacon paging button can be fixed at a specific position. For instance, the beacon paging button may be used in restaurants, bars, hospitals, hotels, factories, etc., and may be fixed at a table of the restaurant, a bed of the hospital or any place that the customers or users can reach. If necessary, the fixing unit may be detachable so that the beacon paging button becomes portable.

In various embodiments of the present disclosure, the beacon paging button may perform general functions as a mobile terminal, for example, but not limited to wireless communication and data processing. For example, the beacon paging button may be a paging button, smartphone, tablet, smart watch, PC, smart glass, smart ring, smart TV, personal digital assistant (PDA), laptop, media player, micro server, global positioning system (GPS) device, electronic book device, digital broadcasting device, navigation, kiosk, MP3 player, digital camera, any smart devices and other mobile or non-mobile computing device, but it is not limited thereto.

Figure 2:
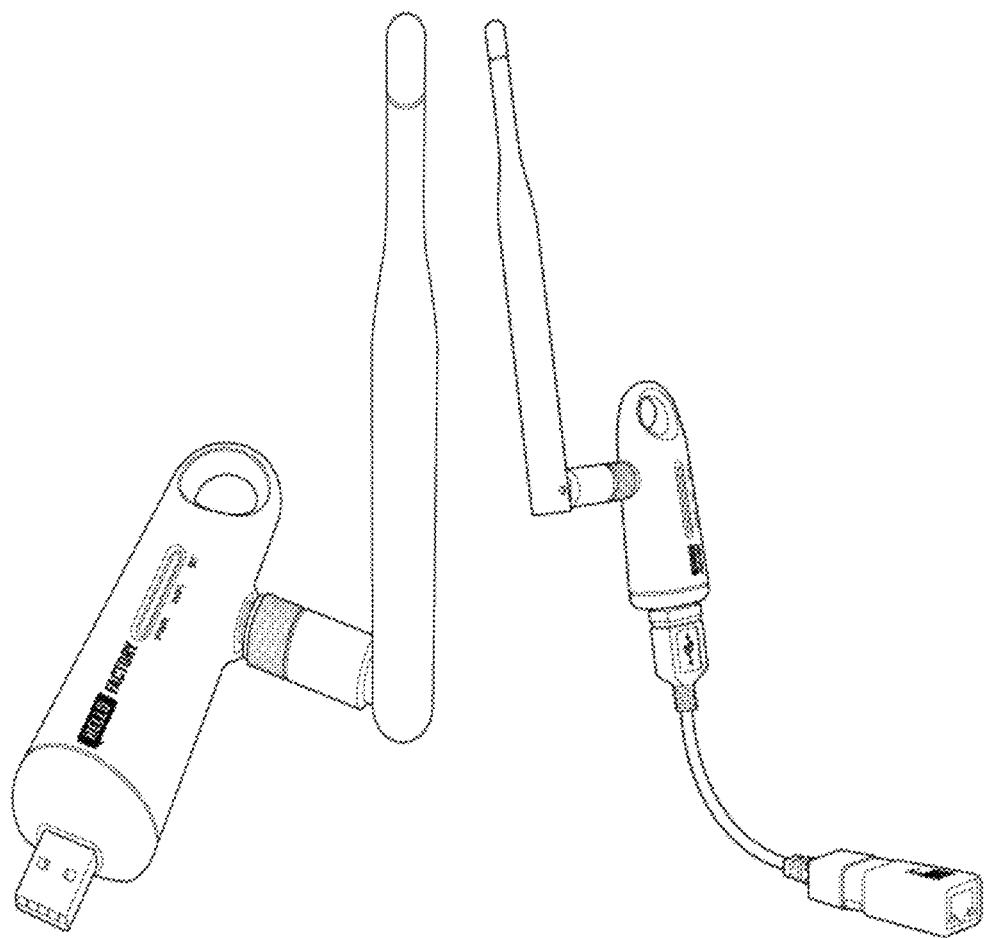
FIG. 2 shows a beacon AP according to an exemplary embodiment of the present disclosure.

FIG. 2 shows a beacon AP according to an exemplary embodiment of the present disclosure.

The beacon AP may receive a signal transmitted from a beacon paging button. The beacon AP may perform scanning for wireless signals, for example, but not limited to, BLE signals, receive wireless signals, such as a BLE signal and identify a transmission subject from the received wireless or BLE signal.

According to some exemplary embodiments of the present disclosure, the beacon AP may receive and/or transmit signals. For example, the beacon AP may transmit the received BLE signal to an operation sever. The beacon AP may be positioned within a range where the beacon AP is capable of performing wireless communication with the beacon paging button. When a near field wireless communication technology is applied, the beacon AP may be installed for each radius that may be recognized as the same space.

Communication radius of the beacon AP may overlap with the radius of another beacon AP. For example, a beacon paging button positioned at a specific space may perform wireless communication with a plurality of beacon APs. The beacon AP may identify which beacon paging button has transmitted the BLE signal received by the beacon AP. In addition, a beacon AP that has identified the beacon paging button first or a beacon AP having the largest BLE signal receiving intensity may continuously perform wireless communication with the corresponding beacon paging button.

Figure 3:
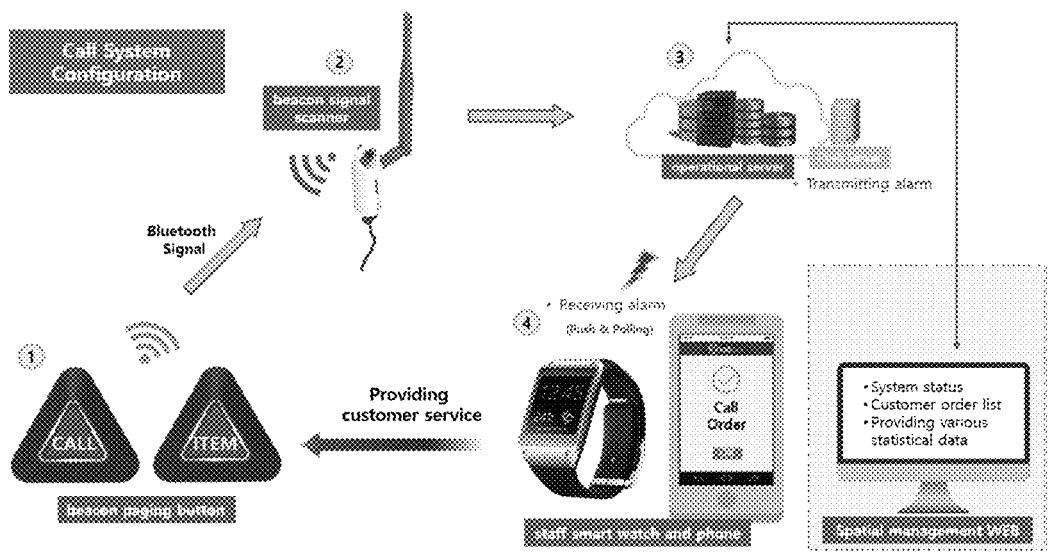
FIG. 3 is a view showing a conceptual diagram of an embodiment of a paging system according to the present disclosure.

FIG. 3 is a view showing a conceptual diagram of an embodiment of a paging system according to the present disclosure.

In the exemplary embodiment, a user may be a person who wants to page other people. A user may be, for example, but not limited to, a customer of a restaurant, patient of a hospital, or employee of a factory. In the exemplary embodiment of the present disclosure, for the convenience of description, description is made by using a restaurant as an example.

In some embodiments of the present disclosure, a paging system may include one or more of a beacon paging button, a beacon AP, an operational server, a staff device, and a spatial management WEB server.

The beacon paging button may receive a button input from a user who wants to be provided with service and transmit a wireless signal, such as a BLE signal, in association with the button input to the beacon AP. The beacon paging button may transmit a BLE signal to the beacon AP periodically or at a specific time slot even when a button input of a user is not input, although such is not required.

For example, the beacon paging button may transmit a signal, for example, but not limited to, a BLE signal, corresponding to a paging command when a customer pages one of staffs of a restaurant by using the beacon paging button. In another example, the beacon paging button may transmit a BLE signal corresponding to an order of a menu when a customer selects a specific food listed in the menu of the restaurant (for example, a bottle of beer). The beacon paging button may broadcast around a BLE signal periodically or non-periodically regardless of a paging command.

The beacon AP may receive the BLE signal transmitted from the beacon paging button, and relay or transmit a signal corresponding to the BLE signal to the operational server connected to the beacon AP in a wired or wireless manner.

The beacon AP may periodically or non-periodically receive the BLE signal transmitted from the beacon paging button and when a specific code is included in the BLE signal, the beacon AP may determine that a paging request is present. When it is determined that the paging request is present, the beacon AP may transmit a signal corresponding to the BLE signal to the operational server.

The beacon AP may identify which beacon paging button has transmitted the BLE signal. In some embodiments, identification information of the beacon paging button may be included in a specific frame of the BLE signal received by the beacon AP.

The operational server may control transmitting and receiving signals between the beacon paging button(s) and the beacon AP(s). The beacon AP may identify which beacon paging button has transmitted a BLE signal based on the received BLE signal. As described above, the beacon AP may identify the beacon paging button which has transmitted the BLE signal. Alternatively, regardless of the beacon paging button identification performed by the beacon AP, the operational server may identify the beacon paging button that has transmitted the BLE signal. The beacon paging button may transmit unique identification information with the BLE signal and/or may transmit the corresponding information included in a specific frame of the BLE signal.

The operational server may pre-store identification information of the beacon paging buttons and specify or identify which beacon paging button has transmitted a BLE signal by comparing the identification information of the beacon paging button pre-stored in the operational server with a BLE signal received from the beacon paging buttons.

The operational server may transmit a paging signal to a staff device. The staff device may include a device of a staff who is the paging recipient. For example, the staff device may be a device, such as a smartphone or smart watch connected to a server in a restaurant.

The staff device may receive a paging signal from the operational server. The staff device, based on the received paging signal, may display information of which beacon paging button has transmitted the paging signal. In response to the information displayed on the staff device, the staff may move to a position where a user who has input the paging request is present and provide a response service corresponding to the information displayed on the staff device.

A server, such as a spatial management WEB server, may check whether or not a response service has been provided from the staff to the user who has input the paging request and receive and manage the paging requests from the user. In addition, the spatial management WEB server may store and manage information related to the number of times that the beacon paging button transmits signals, a transmission interval, etc. within a corresponding space as statistical values. By storing and analyzing data related to the user requests, such data can be used in a marketing tool or efficient operation.

Figure 4:
FIG. 4 illustrates a flow chart of a process or method for paging and responding according to an exemplary embodiment of the present disclosure.

FIG. 4 illustrates a flow chart of a process or method for paging and responding according to an exemplary embodiment of the present disclosure.

The exemplary embodiment shown in FIG. 4 shows an example of communication between a device of a customer who wants to page at least one of restaurant staffs who is the paging recipient, and a device of at least one of restaurant staffs.

In the first step, a customer may input a paging request to be provided with service. For example, the service may mean a broad concept including a charged service, such as ordering food, free or complimentary services, such as requesting battery charging.

For example, the customer may press one time shortly a request beacon button, and the request beacon button may broadcast a wireless signal, such as a BLE signal, corresponding thereto when the request beacon button has received a command input corresponding to the paging request from the customer.

The request beacon button may transmit a single paging signal, such as iBeacon signal or Eddystone-URL signal, or a specific signal when the request beacon button receives a command input corresponding to a paging request from the customer. The specific signal may be a signal including additional information rather than a single paging signal. Like the method used in Google Chrome browser, a method of providing a physical web may be used to display a preset web page when a specific BLE signal is received. Accordingly, by using the request beacon button, a webpage on the Chrome browser of a smartphone may be displayed.

In the second step, the beacon AP may receive the BLE signal broadcasted from the request beacon button and the beacon AP may relay or transfer the BLE signal to the operational server. The operational server may transmit a paging request signal to at least one staff device, for example, but not limited to, a smart watch, a portable device, a tablet, a smartphone, or any device having wireless communication function, in response to the BLE signal.

In the third step, the device of the staff, for example, the smart watch worn by the staff of the restaurant, may display information related to or corresponding to the paging request signal transmitted from the request button. In addition, a staff of the restaurant who is capable of providing the response service requested by the customer may input an acceptance or confirmation input to his or her device, such as a smart watch, so that the paging receiver may be specified.

The operational server may store matching information between the customer and the restaurant staff, and may transmit a paging request signal of the customer to the device (e.g. the smart watch) of the corresponding restaurant staff. For instance, the operational server may store information on who, among restaurant staffs, have responded or received a paging request of a specific customer, and transmit a paging request of the specific customer to the device of the restaurant staff who have responded or received a paging request of a specific customer before. However, the operational server may transmit a paging request signal to one or more devices, such as a smart watch, of other restaurant staff when the operational server determines that a requested service of the restaurant staff who was paged may be delayed by more than a predetermined time period. By one to one matching between a customer and a restaurant staff, a service provider may provide high-quality of service to their customers.

In the fourth step, the restaurant staff who has accepted to provide the response or requested service may go to the customer who has input the paging request, and by performing tagging between the beacon paging button of the table where the customer is present and the device (e.g. a smart watch) of the restaurant staff, the operational server may be notified that the restaurant staff is responding to a customer request.

In certain embodiments of the present disclosure, tagging may be an act of enabling communication between at least two electronic devices by bringing one or both electric devices within a certain distance of each other. The tagging may include a contactless act, a proximity sensing touch, or an actual physical touch. For example, when the smart watch of the restaurant staff approaches the beacon paging button of the table within a certain distance, for example, but not limited to 10 cm, tagging may be performed by using a proximity sensor.

A server, for instance, but not limited to, an operational server or a spatial management WEB server, may measure time intervals from when a customer inputs a paging request to when a restaurant staff accepts the paging request, from when a customer inputs a paging request to when tagging is performed as the restaurant staff moves on the corresponding position, and/or from when a customer inputs a paging request to when tagging is performed by the device of the restaurant staff. The operational server may store, accumulate and manage data on the measured time intervals, and the data can be used as statistical information for response services.

In the fifth step, the customer may interact with the restaurant staff (in person or face to face) to request a desired service to the restaurant staff. The restaurant staff may provide a service requested by the customer, for example, but not limited to, ordering food or payment requests.

Figure 5:
FIG. 5 shows a flow chart for ordering food according to an exemplary embodiment of the present disclosure.

FIG. 5 shows a flow chart for ordering food according to an exemplary embodiment of the present disclosure.

The exemplary embodiment shown in FIG. 5 shows an example of communication between a device of a customer who wants to input a paging request and at least one device of at least one restaurant staff who becomes a paging recipient or receiver.

In the first step, a customer may input a paging request, for example, but not limited to, when requesting a service, such as requesting a menu or the check, asking questions, and when needing to talk to a person working at the restaurant.

The customer may shortly press a table beacon button one time and the table beacon button may transmit a wireless signal, for example, but not limited to, a BLE signal, when the table beacon button has received a command input corresponding to the paging request from the customer.

The beacon AP may receive the BLE signal transmitted from the table beacon button and a server (e.g., an operational server) may transmit a path for accessing a web page that a web or online order of the restaurant is available by using the corresponding table beacon button.

A device, provided on a table or bar, can display an electronic menu enabling a customer to make a web or online order. The device may be, for instance, but not limited to, a table, smartphone, portable device, or any device having a display. Each device may have a unique identification information. The device for providing online order service may be connected to the table beacon button in a wired and/or wireless manner, and/or may display an electronic menu so that the device can provide online order service to the customer through the electronic menu of the device.

In an exemplary embodiment of the present disclosure, a device of the customer, such as a portable device, a smart device, like smartphone and a smart watch, a tablet, a personal computer and any electronic device that can be connected to the server, may display an electronic menu enabling the customer to input a web order. When information or identification of the device of the customer has been registered or registered previously in the operational server, the electronic menu may be displayed on the device of the customer in response to a customer pressing the table beacon button.

There may be various examples of cases when information or identification of a device of a customer has been registered or registered in the operational server. In the first example, the advance registration may be performed by directly performing wireless communication between the wireless device, such as a smartphone of the customer and the table beacon button. For example, the beacon AP as well as the wireless device of the customer may receive a wireless signal, e.g., a BLE signal, broadcasted from the table beacon button and the customer may authenticate the table beacon button by using the customer's wireless device. After establishing a session between the table beacon button and the wireless device of the customer, the customer may proceed with the next process by using or pressing the table beacon button.

In the second example, the advance registration may be performed by inputting identification information of the table beacon button through the device, such as a smartphone, of the customer. For example, each table beacon button has been assigned unique identification number(s) and/or character(s) (for example, ID number and/or character) may be assigned and the unique identification numbers and/or characters of the table beacon buttons may be stored or registered on the web. Additionally, the table beacon button may be registered on the device of the customer by capturing or inputting a QR code, or by performing NFC tagging.

When the identification information of the table beacon button has been registered on the device of the customer, the operational server may start to provide a service on the assumption that the customer is present at the table corresponding to the registered table beacon button.

In the third example, the advance registration may be performed by performing communication with a device of a customer within a predetermined or specific space so that the operational server can automatically match the device of the customer to the corresponding table beacon button. For example, the customer's smartphone may receive a signal transmitted from a server associated with a restaurant by a wireless communication method, for example, but not limited to, WiFi or Bluetooth installed in a specific space of the restaurant and each of the table beacon buttons may transmit a wireless signal, such as a BLE signal, which is different from each other. The smartphone of the customer may perform the next operation by matching the signal of the restaurant with the BLE signal (if necessary, matching between devices that have the strongest signal receiving intensity).

The beacon AP may receive the BLE signal broadcasted from the table beacon button, and the beacon AP may relay or transmit the BLE signal to the operational server. The operational server may transmit a paging request signal to at least one device of a staff, for example, but not limited to, a preset smart watch, a portable device, a wireless communication device, a device having a display, a tablet, a personal computer, a terminal and any device that can communicate with the server.

In the second step, the customer may input an order based on the information displayed in the electronic menu. In this step, preferably, the order may mean ordering a food that may be selected from the electronic menu. The ordering may be proceeded by using an input from the customer, such as text or voice and selectable items displayed on the electronic menu.

The customer may be simply provided with or order different food items selectable from the electronic menu. Alternatively, the customer may be provided with various types of information related to the electronic menu. The device displaying the electronic menu may provide device-related information, for instance, but not limited to, information related to table PC located on or adjacent to the table or a smartphone of the customer. For example, the device may display, when a customer is ordering food through the electronic menu, nutritional information such as calories, menu information such as recommended items, previously ordered information, payment information, etc.

In the third step, the operational server may receive, identify and/or specify the customer's order based on the received BLE information and order information. For example, the operational server may receive, identify and/or specify that a steak combo meal set was ordered from the table number 3.

The operational server may transmit the order information to a device of a restaurant staff, such as smart watch of the restaurant staff and the smart watch of the restaurant staff may receive the order information. The smart watch worn by the restaurant staff or the device carried by the restaurant staff may display the information in which table beacon button has transmitted the paging request. For instance, the device of the restaurant staff may display location identifier, for example, but not limited to, the table number or the table location corresponding to the table beacon button transmitted the paging request.

In the fourth step, the device of a restaurant staff such as the smart watch may receive input of acceptance information to provide a response service for the order information and the server may create matching information between the customer or table and the restaurant staff and store that the restaurant staff inputting the acceptance information is a paging receiver of the table corresponding to the table beacon button transmitting the paging request.

During the fourth step, the operational server may store matching information between the customer table and the restaurant staff. After matching information between the customer or table and the restaurant staff, the information is stored in the server when the server receives a paging request signal from the same customer or table, the server may transmit the paging request signal to the smart watch of the same restaurant staff who has responded before based on the stored matching information. However, the operational server may transmit the paging request signal to one or more devices, such as a smart watch to other restaurant staff(s) when the operational server estimates or determines that the restaurant staff who is matched with the customer or table by the matching information may delay a service corresponding to the paging request signal or cannot provide such service within a predetermined time. Because the paging system provides one to one matching between a customer and restaurant staff, the restaurant may provide higher quality service to the customer.

In the fifth step, the restaurant staff who has accepted to provide the response service may bring the food to the position of the table or customer who has inputted the paging request through the paging button. By performing tagging between the paging button of the table where the customer is present and the device of the restaurant staff, the paging button and/or the device of the restaurant staff can transmit to a server information that the restaurant staff is actually providing the response service in response to the customer's request.

A server, for instance, but not limited to, an operational server or a spatial management WEB server, may measure time intervals from when the customer inputs the paging request to when the restaurant staff accepts the paging request, from when the customer inputs the paging request to when tagging is performed as the restaurant staff moves to the corresponding position, and/or from when a customer inputs a paging request to when tagging is performed by the device of the restaurant staff. The operational server may store, accumulate and manage data on the measured time intervals, and the data can be used as statistical information for response services.

Figure 6:
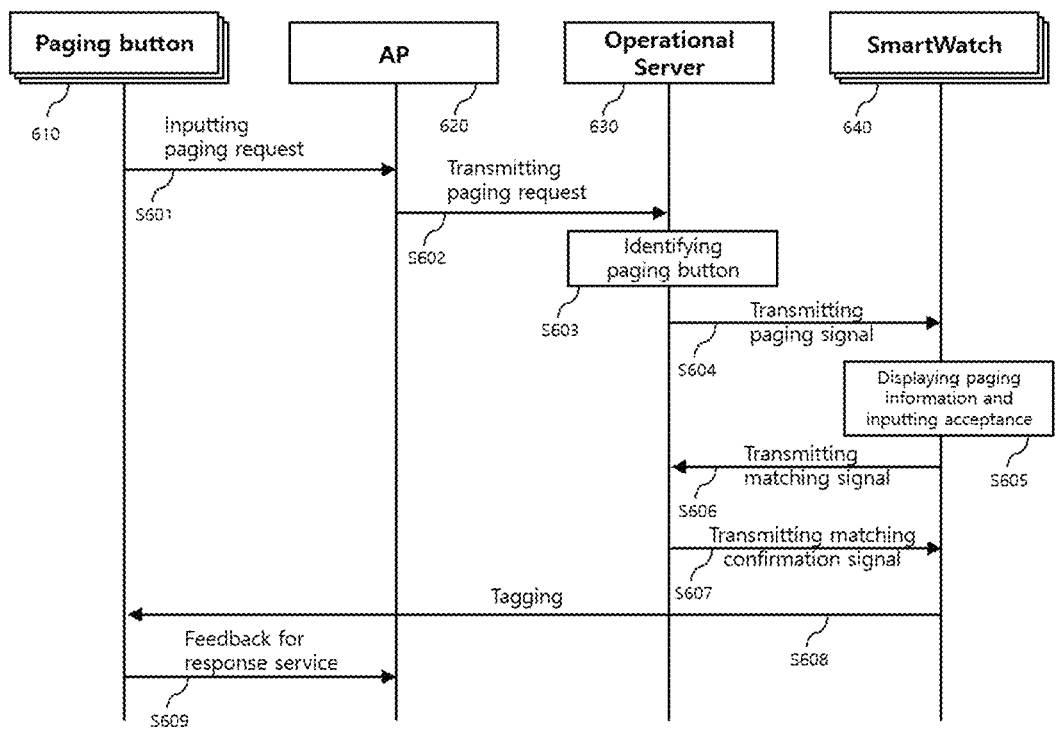
FIG. 6 shows a flow chart of exemplary operations of devices in response to a paging request according an embodiment of the present disclosure.

FIG. 6 shows a flow chart of exemplary operations of devices in response to a paging request according an embodiment of the present disclosure.

A paging button 610 may include an input part. In step S601, the paging button 610 may receive input from a user or customer who wants to input a paging request and generate a paging command signal in response to the user's input. The paging button 610 may transmit a paging signal which may be a wireless signal, for example, but not limited to, a BLE beacon signal, to an AP 620 in response to the paging command signal.

In step S602, the AP 620 may receive the BLE beacon signal from at least one paging button 610. Wireless communication, such as Bluetooth, WiFi, NFC, Zigbee, etc. may be performed between the paging button 610 and the AP 620.

The AP 620 may transmit the received paging signal to an operational server 630. For example, the operational server 630 may comprise an apparatus being capable of supporting transmission and reception of information between the paging button 610, a beacon, and a restaurant staff's device 640.

In step S603, the operational server 630 may identify or specify which paging button has transmitted a paging request based on the paging signal received from the AP 620. For example, the BLE beacon signal transmitted from the paging button 610 may include information capable of identifying the paging button 610.

In step S604, the operational server 630, after identifying or specifying which paging button 610 has transmitted the paging request, may transmit the paging signal to at least one device 640 of the restaurant staff connected to the operational server 630. For example, an operational server of a specific restaurant may transmit a paging signal to a smart watch, a tablet, a portable device, a smart device, or any wireless communication device of at least one restaurant staff (server).

In step S605, each device 640 of the restaurant staff may receive the paging signal from the operational server 630. The device 640 carried by the restaurant staff may include a display unit that can display paging information. For example, the smart watch or tablet 630 carried by the restaurant staff may display information that a paging request is from the table 3 of the restaurant.

One of the restaurant serving staffs who carries or wears the device 640 (e.g. a smart watch) may input, through the device 640, acceptance information indicating that that server is willing to handle the paging request.

In step S606, the staff device or the smart watch 640 may transmit a matching signal indicating that one or more restaurant serving staffs among restaurant staffs carrying or wearing the staff device or the smart watch 640 will respond to or serve the paging request to the operational server 630.

In step S607, the operational server 630 may transmit to the smart watch or the device 640 of the staff a matching confirmation signal indicating, which device or smart watch of the staff is matched with the paging request of the customer. The device 640 of the staff may receive the matching confirmation signal from the operational server 630 and display or notify information of the matching confirmation signal, and therefore the restaurant serving staff who has on or is wearing the portable device or the smart watch 640 may check the matching confirmation information and confirm that the matching process is completed.

When the operational server 630 receives acceptance information from a plurality of devices or smart watches 640 of the staffs, the operational server 630 may determine which device among the devices 640 of the staffs sent the acceptance information, or who among the staffs sent the acceptance information through the staff devices 640, is matched to the paging request or the paging button 610 which sent the paging request by using various predetermined conditions or preset factors.

In one example, the matching process may be performed to the device or the smart watch 640 of the staff that has transmitted first a matching signal to the operational server 630. Optionally, the operational server 630 may transmit to a device or a smart watch 340 of a staff having low priority a matching confirmation signal indicating that the matching process has been or will be performed with another device or smart watch of another staff having high priority.

In another example, the operational server 630 may perform matching with the device or the smart watch 640 of the staff, which has low priority among the devices of staffs transmitting matching signals, when that device or smart watch 630 is determined to be an idle state according to predetermined factors for the matching process. Optionally, the operational server 630 may transmit to devices or smart watches of staffs not matched to the page request or the paging bell 610 a matching confirmation signal indicating that the matching process has been or will be performed with another device or smart watch or another staff.

In step S608, tagging may be performed between the device or smart watch 640 of the staff and the paging button 610. For example, a restaurant staff carrying or wearing the device or smart watch 640 may move to a position where the paging button 610 is located and perform the tagging, for example, by tagging the device 460 of the staff to the paging button 610 so as to notify that the staff has moved to or near the position associated with the paging button 610. The tagging may not require a physical contact. For example, the tagging may be performed by checking that devices are approaching within a certain distance range by using a proximity sensor.

In step S609, the customer who has pressed the paging button 610 and the restaurant staff carrying or wearing the device or the smart watch 640 may interact so that a customer request may be serviced. For example, the restaurant staff may provide a response service for a food order or special request from the customer.

The paging button 610 may transmit feedback for the response service to the AP 620 after the tagging being performed. For example, after serving by the restaurant staff is completed, the paging button 610 may continuously transmit BLE beacon signals to the AP 620, and the operational server 630 may statistically manage how much time has passed from the last response time based on the above information.

Figure 7:
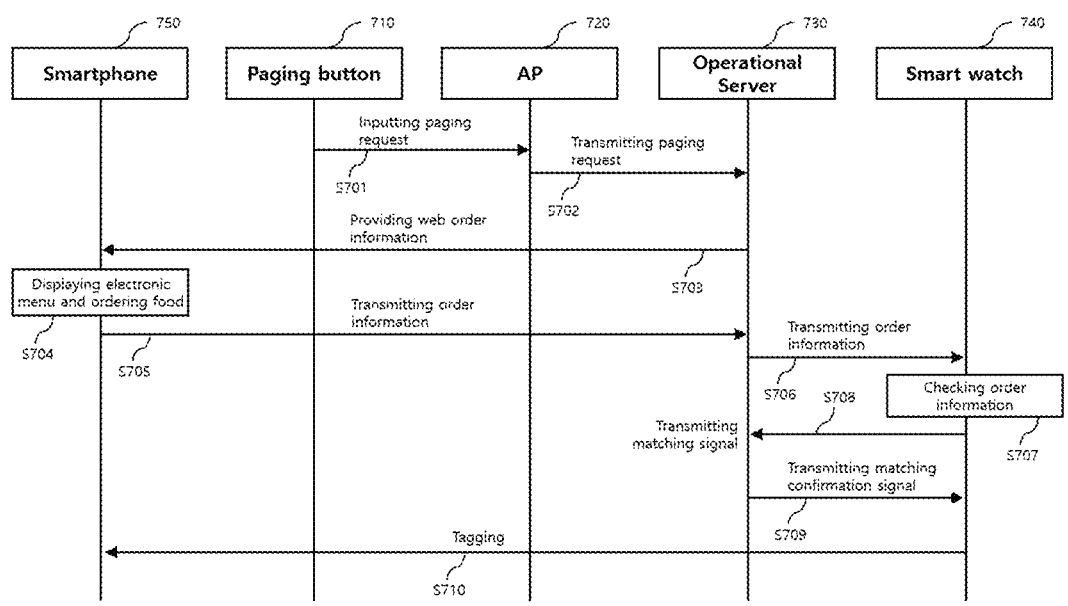
FIG. 7 illustrates exemplary operations of devices according to another embodiment of the present disclosure.

FIG. 7 illustrates exemplary operations of devices according to another embodiment of the present disclosure.

The exemplary embodiment related to FIG. 6 generally describes a process that a customer pages a restaurant staff by pressing a paging button. The exemplary embodiment related to FIG. 7 will describe a process that a customer can transfer a specific request from a customer by inputting a stall paging request before facing a restaurant staff.

A paging button 710 may include an input part. In step S701, the paging button 710 may receive input from a customer (or user) who wants to page someone within a restaurant through the input part, and generate a paging commend signal in response to the customer's input. The paging button 710 may transmit a page signal, which is a wireless signal, such as a BLE beacon signal, to an AP 720 when the paging command signal is received.

In step S702, the AP 720 may receive the wireless signal (e.g., the BLE beacon signal) from at least one paging button 710. Wireless communication such as Bluetooth, WiFi, NFC, Zigbee, etc. may be performed between the paging button 710 and the AP 720.

The AP 720 may transmit the received paging signal to the operational server 730. For example, the operational server 730 may comprise an apparatus being capable of supporting transmission and reception of the information between the paging button 710, the AP 720, and a restaurant staff's device 740, such as a smart watch.

In step S703, the operational server 730 may identify or specify which paging button has transmitted the paging signal based on the paging signal received from the AP 720. For example, the BLE beacon signal transmitted from the paging button 710 may include information for identifying the paging button 710.

The operational server 730 may provide web order information or available service list information to a device 750, such as a smartphone, of a customer or user associated with one of paging buttons 710. The device of the customer 750 may be a device positioned at or near the table or space of the paging button and/or belonging to a restaurant. The server 730 may match and store identification information of the paging button 710 and identification information of the device or smartphone 750 of the customer in advance, and the server 730 may provide web order information and/or available service list information to the device or smartphone 750 of the customer.

The device 750 of the customer, for example, but not limited to, a customer's portable device, may be a device belonging to a customer who has inputted a paging request. Alternatively, the device 750 of the customer may be a device that belongs to a restaurant and located at or near a bar or table. The device can be used only within the area allowed by the restaurant. The operational server 730 may perform a process of matching identification information of the paging button 710 with identification information of the device or smartphone 750 of the customer.

The matching process of the identification information of the smartphone of is performed customer by the operational server in advance may be implemented as various exemplary embodiments. First, pre-registration may be performed by directly performing wireless communication between the smartphone or portable device of the customer and the paging button located near or at the table or bar. For example, the AP and the device of the customer may receive a wireless signal, for example, but not limited to a BLE signal, broadcasted from the paging button, and the customer may authenticate the paging button that the customer wants to use or which is located near the customer by using the customer's device or smartphone. After setting session between the paging button and the device or smartphone of the customer, the customer may progress next process by pressing the table beacon button.

Second, identification information of the paging button may be inputted through the smartphone of the customer. For example, a unique identification number, characters or combination thereof of the paging button (for example, ID number) may be registered on the web, or the paging button may be registered on the smartphone of the customer by capturing and inputting a QR or bar code, or by performing NFC tagging.

When the identification information of the paging button has been registered on the device or smartphone of the customer, the operational server may provide a service to the customer on the assumption that customer is present at the table corresponding to the paging button.

Third, when the smartphone performs communication within a specific space, the operational server may automatically perform relation matching between the corresponding paging button and the device or smartphone of the customer. For example, the customer's smartphone may receive a signal transmitted from the restaurant by a wireless communication method, such as WiFi or Bluetooth installed in a specific space of the restaurant and the paging button may transmit a BLE signal different from those of other paging buttons. The device or smartphone of the customer may perform next operation by matching the signal of the restaurant with the BLE signal (if necessary, matching between different devices depending on the strength of the signal).

Fourth, the device or smartphone of the customer may transmit reservation information to the operational server in advance, the operational server may perform matching between the device or smartphone of the customer and the paging button in advance, and the operational server may directly receive web order information from the device or smartphone of the customer. For example, a customer may make reservation for a table of a restaurant in advance, for example, a Table 3 next to the window at 7 p.m., and the operational server may perform matching associating the device smartphone of the customer at 7 p.m. to or with Table 3 which is reserved by the customer.

In step S704, the device or smartphone 750 of the customer may display an electronic menu based on the web order information. The electronic menu may be a web menu or a menu displayed by executing a specific application program, or any menu in the electronic form.

A user of the device or smartphone 750 may order food based on the information displayed on the electronic menu or request service among available services displayed on the available service list. For example, the user may input a food order of a steak combo meal displayed on the smartphone 750. In this step, the order may comprise ordering a food that may be selected from the electronic menu. The ordering may be proceeded by using an input such as text or voice or providing selectable menu on the electronic menu.

In step S705, the device of the customer or the smartphone 750 may transmit order information received from the customer, to the operational server 730.

In step S706, the operational server 730 may transmit the order information to at least one device or smart watch 740 of at least one staff. For example, the operational server 730 of the restaurant may transmit the order information to a smart watch or tablet 740 worn by or carried by a serving staff (server) of the restaurant. For example, information indicating that a steak combo meal was ordered by Table 3 may be transmitted.

In step S707, the smart watch 740 having been received the order information may display which customer has made the order and which item or service the customer ordered or requested, and the restaurant staff wearing or carrying the smart watch or portable device 740 may check the information on the customer, the table, the order and/or the requested service.

In step S708, the restaurant staff may transmit to the operational server 730 matching information indicating the he or she is responsible for the corresponding order and will provide the requested service.

In step S709, the operational server 730 may perform matching between the customer (or the table or the device of the customer) and the restaurant staff (or the device of the staff) in association with the device of the staff, such as a smart watch, that has transmitted the matching information. After performing matching, matching confirmation information may be transmitted to other devices or smart watches of other staffs in addition to the matched smart watch of the staff, although such is not required. For instance, the matching confirmation information may be transmitted to the matched smart watch of the staff, as well as to other smart watches of other staff not being matched so that the matching information may be shared among the customer and/or restaurant staffs. Accordingly, the exemplary embodiment of the present disclosure may provide a customized customer service.

In step S710, tagging may be performed between the device 740 of the staff and the device 750 of the customer, such as between the smart watch 740 and the smartphone 750, and this may be used as information representing that the matched restaurant staff is serving the customer who has made the order or has requested the specific service.

After completing the tagging, the paging button may continuously transmit wireless signal, such as BLE beacon signals, etc. even after serving the corresponding paging request that has been completed to provide convenience to the customer. For example, after bringing the menu, after elapsing a predetermined time such as ten minutes, the restaurant staff may move again to the customer, and thus provide an environment of checking whether the customer needs additional service or order.

Figure 8:
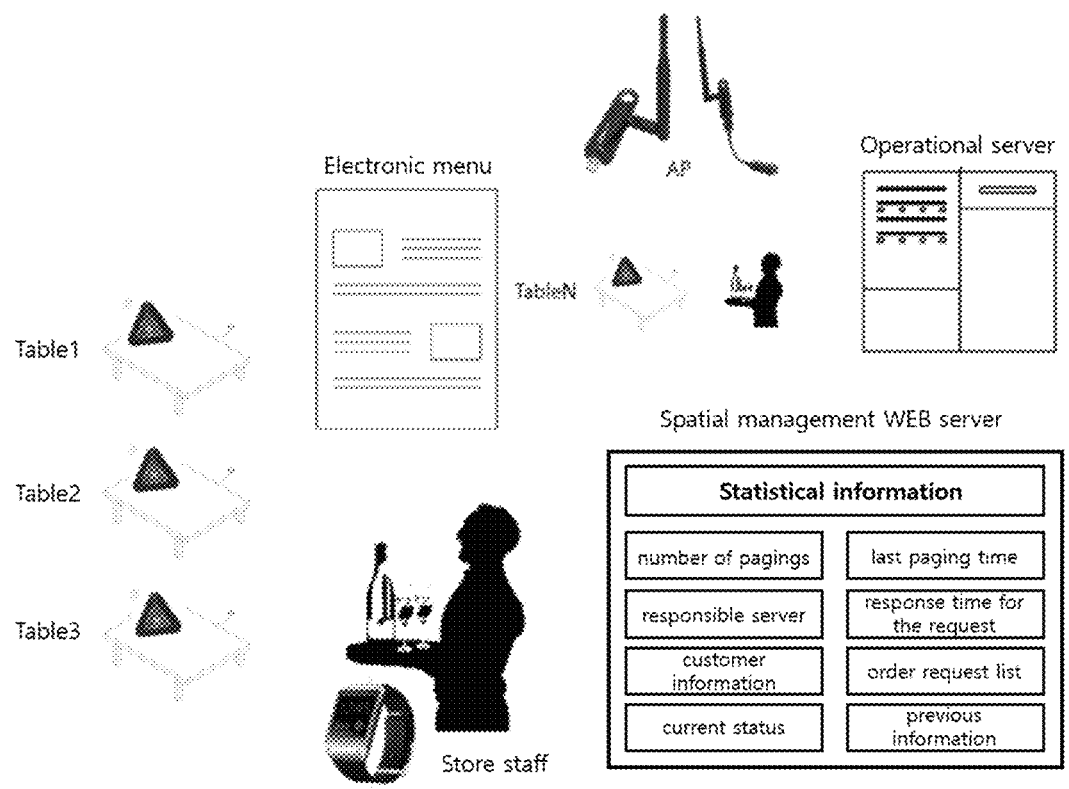
FIG. 8 shows a conceptual diagram of a paging system according to an exemplary embodiment of the present disclosure.

FIG. 8 shows a conceptual diagram of a paging system according to an exemplary embodiment of the present disclosure.

As shown in FIG. 8, an operational server may provide an additional service for a spatial management WEB server and customer response service. The operational server may be a subject or server that may perform communication with a paging button and/or an AP. The spatial management WEB server may be a server managing a response service between an actual customer and a restaurant staff.

The spatial management WEB server may transmit various types of information to a customer device based on paging information of the customer. The customer device may be a device belonging to the customer or may be a device belonging to the restaurant, which is positioned at or near the space of the customer.

The spatial management WEB server may transmit to the customer an accumulated order list of the customer when the customer is identified, thus enabling the customer to easily make an order. In the restaurant, the server may provide or transmit recommendation information on a popular food or a food based on health related information to the customer via the customer's device. Alternatively, the order list information made by another customer or estimated temporal information for the food may be transmitted.

The spatial management WEB server may automatically transmit a signal for sending a restaurant staff to provide an easy order when order information has not been received from the customer for a predetermined time or more. Herein, the restaurant staff may directly move to the position where the customer is present to support an easy order or the customer.

The spatial management WEB server may provide various types of contents to a customer device. For example, TV videos related to the order from the menu chosen by the customer may be provided. The customer may be provided with higher quality service based on the received content.

After completing the order, the spatial management WEB server may provide game contents to a customer device. By providing associated game contents to the customer's device or providing benefits to the game played by the customer after completing the order, game contents may be provided until an actual service is provided.

In some embodiments of the present disclosure, the paging button and the customer device, such as a smartphone, are described as separate devices. However, when the customer device is capable of transmitting a BLE beacon signal, the paging button and the customer's device may be implemented as a single device, although such is not required. For example, the paging button and the customer's device, such as a smartphone or tablet, which are provided in or located near the table of the restaurant may be one single device and perform a paging request and/or an order request.

The description suggests some exemplary embodiments of the present disclosure to provide an example that explains the present invention and also enables one skilled in the art to manufacture and use of the present invention. The specification drafted as such is not limited to detailed terms suggested in the specification.

Accordingly, it will be apparent to those skilled in the art that various modifications, changes, and variations may be made in the example without departing from the scope of the invention. For example, in order to achieve the effect intended by the present invention, it is to be noted that all the functional blocks shown in the attached drawing may not be needed to achieve the effect desired by the present disclosure and even that case may be included in the technical scope of the present disclosure defined by the appended claims.

The invention claimed is:

1. A server, comprising:
   one or more processors; and
   memory storing executable instructions that, if executed by the one or more processors, configure the server to:
   receive a first signal including at least one paging request and transmitted from at least one of a plurality of paging or ordering buttons;
   identify which of the paging or ordering buttons transmits the first signal received by the server;
   transmit to at least one portable device a second signal including information on an identifier corresponding to the identified paging or ordering button that transmits the first signal, and the paging request;
   receive, from the at least one portable device, a third signal which is transmitted in response to an acceptance input responded to the paging request; and
   transmit to the at least one portable device a fourth signal indicating that the at least one portable device transmitting the third signal is matched to the identified paging or ordering button in response to the third signal received from the at least one portable device.

2. The server of claim 1, wherein the processor is configured to receive the first signal from the at least one of a plurality of paging or ordering buttons.

3. The server of claim 1, wherein the processor is configured to receive the first signal from at least one access point (AP) which receives the first signal from one of the paging or ordering buttons.

4. The server of claim 3, wherein the paging or ordering buttons are configured to:
   transmit a first wireless local area communication signal to the AP in response to the paging request input to the paging or ordering buttons, and
   transmit a second wireless local area communication signal to the AP periodically regardless of the paging request input to the paging or ordering buttons.

5. The server of claim 4, wherein the first wireless local area communication signal and the second wireless local area communication signal are different from each other, the first wireless local area communication signal transmitted in response to the paging request includes the at least one paging request, and the second wireless local area communication signal transmitted to the AP periodically does not include the at least one paging request.

6. The server of claim 1, wherein the first signal is a wireless local area communication signal.

7. The server of claim 1, wherein the processor is configured to receive, from the identified paging or ordering button and/or the at least one portable device, a fifth signal including tagging or scanning information between the identified paging or ordering button and the at least one portable device.

8. The server of claim 7, wherein the tagging or scanning information is generated when the at least one portable device is in contact with the paging or ordering button.

9. The server of claim 7, wherein the tagging or scanning information is generated when the at least one portable device approaches the paging or ordering button within a preset distance range.

10. The server of claim 7, further comprising a spatial management WEB server configured to manage the tagging or scanning information between the at least one portable device and the paging or ordering button.

11. The server of claim 1, wherein the processor is configured to, when the server receives a plurality of the third signals from a plurality of the at least one portable device, select one of the plurality of the at least one portable device according to at least one predetermined factor and match the identified paging or ordering button with the selected portable device.

12. The server of claim 11, wherein the processor is configured to select a portable device, from which the server receives the third signal first, among the plurality of the at least one portable device for a predetermined time.

13. The server of claim 1, wherein at least one customer device is associated with one of the paging or ordering buttons and configured to receive web order information from the server.

14. The server of claim 13, wherein the processor is configured to perform matching between the one of the paging or ordering buttons having transmitted the first signal and the customer device receiving the web order information.

15. The server of claim 14, wherein the processor is configured to perform the matching based on the first signal transmitted from the one of the paging or ordering buttons and to determine that the matching has been performed between the one of the paging or ordering buttons and the at least one customer device when the at least one customer device transmits the web order information to the server.

16. A paging method, comprising:
   receiving, by a server, a first signal including at least one paging request which is transmitted from one of a plurality of paging or ordering buttons;
   identifying, by the server, which of the paging or ordering buttons transmits the first signal received by the server;
   transmitting, by the server, to at least one portable device a second signal including information on identifier corresponding to the identified paging or ordering button that transmits the first signal, and the paging request;
   receiving, by the server, a third signal which is transmitted from the at least one portable device in response to an acceptance input responded to the paging request; and
   transmitting, by the server, to the at least one portable device a fourth signal confirming that the at least one portable device transmitting the third signal is matched with the identified paging or ordering button in response to the third signal received from the at least one portable device.

17. The method of claim 16, wherein the first signal is a wireless local area communication signal.

18. The method of claim 16, further comprising receiving, by the server, a fifth signal including tagging or scanning information between the identified paging or ordering button and the at least one portable device and transmitted from the identified paging or ordering button and/or the at least one portable device.

19. The method of claim 16, further comprising, when the server receives a plurality of the third signals from a plurality of the at least one portable device, selecting, by the server, one of the plurality of the at least one portable device according to at least one predetermined factor and match the identified paging or ordering button with the selected portable device.

20. The method of claim 16, further comprising:
   receiving, by at least one access point (AP), the first signal from one of the paging buttons and transmitting, by the at least one AP, the first signal to the server; and
   transmitting, by the paging or ordering buttons, wireless local area communication signals to the at least one AP periodically.

* * * * *